United States Patent
Furuya et al.

(10) Patent No.: US 12,084,081 B2
(45) Date of Patent: Sep. 10, 2024

(54) DRIVING ASSIST DEVICE

(71) Applicant: SUBARU CORPORATION, Tokyo (JP)

(72) Inventors: Takahiro Furuya, Tokyo (JP); Hideki Sugawara, Tokyo (JP); Anfen Ye, Tokyo (JP); Kazuki Yamaguchi, Tokyo (JP); Wataru Matsudate, Tokyo (JP); Hayato Hori, Tokyo (JP); Takayuki Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/067,467

(22) Filed: Dec. 16, 2022

(65) Prior Publication Data

US 2023/0227056 A1   Jul. 20, 2023

(30) Foreign Application Priority Data

Jan. 20, 2022   (JP) .................................. 2022-007427

(51) Int. Cl.
   *B60Q 1/00*       (2006.01)
   *B60W 30/095*    (2012.01)
   *B60W 50/14*     (2020.01)

(52) U.S. Cl.
   CPC ........ *B60W 50/14* (2013.01); *B60W 30/0953* (2013.01); *B60W 2050/143* (2013.01);
   (Continued)

(58) Field of Classification Search
   CPC ............. B60W 50/14; B60W 30/0953; B60W 2050/143; B60W 2050/146; B60W 2552/00; B60W 2554/4046; B60W 2050/0068; B60W 2540/20; B60W 30/18154; B60W 30/18159;
   (Continued)

(56) References Cited

U.S. PATENT DOCUMENTS 11,524,688 B2 * 12/2022 Kato ................... G01C 21/3602
2018/0308360 A1 * 10/2018 Regmi .................... G08G 1/162
(Continued)

FOREIGN PATENT DOCUMENTS

JP           2019-16000 A     1/2019

*Primary Examiner* — Anh V La
(74) *Attorney, Agent, or Firm* — Rimon P.C.

(57) ABSTRACT

A driving assist device includes, a traveling environment information acquisition unit, an intersection determination unit, a vehicle position information acquisition unit, a predicted travel path setting unit, a blinker signal acquisition unit, a traffic division information acquisition unit, a determination unit, and a notifier. The determination unit determines whether directions indicated by three factors of traffic division information acquired by the traffic division information acquisition unit; a blinker signal acquired by the blinker signal acquisition unit, and a predicted travel path predicted by the predicted travel path setting unit match each other. When the determination unit determines that directions indicated by two factors of the three factors match each other and a mismatch occurs between the directions indicated by the two factors and a direction indicated by a remaining factor of the three factors, the notifier issues a notification about the mismatch of the direction indicated by the remaining factor.

9 Claims, 7 Drawing Sheets

(52) U.S. Cl.
CPC ... *B60W 2050/146* (2013.01); *B60W 2552/00* (2020.02); *B60W 2554/4046* (2020.02)

(58) Field of Classification Search
CPC ........... B60W 2556/50; G01C 21/3602; G01C 21/3658; B60Y 2200/11
USPC ....... 340/425.5, 465, 475, 426.22, 435, 436, 340/919, 905, 903
See application file for complete search history.

(56) References Cited

U.S. PATENT DOCUMENTS

2020/0200561 A1\* 6/2020 Jin ..................... G01C 21/3629
2020/0242938 A1\* 7/2020 Suzuki .................. G08G 1/052
2021/0316750 A1\* 10/2021 Jo ................... B60W 30/18154

\* cited by examiner

DRIVING ASSIST DEVICE

CROSS-REFERENCE TO RELATED APPLICATIONS

The present application claims priority from Japanese Patent Application No. 2022-007427 filed on Jan. 20, 2022, the entire contents of which are hereby incorporated by reference.

BACKGROUND

The disclosure relates to a driving assist device that, in a case where a vehicle is entering an intersection and directions indicated by two factors out of three factors match but the direction indicated by the remaining factor does not match these directions, issues a notification about a mismatch of the direction indicated by the remaining factor before the vehicle enters the intersection. The three factors include a blinker signal indicating a left or right turn, a predicted travel path, and a traffic division.

In general, the lanes of a road before an intersection are designated as traffic divisions including a straight ahead only lane, a right turn only lane, and a left turn only lane. Such traffic divisions are designated by road signs or road markings before the intersection. A driver recognizes the road signs or road markings while driving, and drives the vehicle in the lane corresponding to the direction in which they wish to travel before entering the intersection.

However, at this time, the driver of the vehicle might not see the road signs and road markings indicating the traffic divisions due to careless driving or being unfamiliar with the road. Thus, the driver may enter the intersection while driving in a lane designated as a traffic division for a travel direction different to the one intended. Despite this, the driver will advance the vehicle in the direction in accordance with the designated division.

A technique described in Japanese Unexamined Patent Application Publication (JP-A) No. 2019-16000 is an example of a technique for dealing with a case where a driver mistakes an arrow light for turning left as one for turning right. In other words, in JP-A No. 2019-16000, the driver who wants to turn right drives the vehicle along a specific traffic division, turns on the right blinker, and waits with the vehicle in a stopped state until the arrow light of the traffic signal comes on.

Then, in a case where the arrow light comes on, the driver moves to advance the vehicle. However, in a case where the onboard camera recognizes that the arrow light that has come on indicates a left turn, a driving assist device detects a mismatch between the direction in which the driver is attempting to drive the vehicle and the direction permitted by the arrow light, and thus issues an alert. If the driver continues to drive and enter the intersection even after the alert, the driving assist device is configured to perform deceleration control of the vehicle.

SUMMARY

An aspect of the disclosure provides a driving assist device. The driving assist device includes a traveling environment information acquisition unit, an intersection determination unit, a vehicle position information acquisition unit, a predicted travel path setting unit, a blinker signal acquisition unit, and a traffic division information acquisition unit, a determination unit, and a notifier. The traveling environment information acquisition unit is configured to acquire traveling environment information that is information on a traveling environment ahead of a vehicle. The intersection determination unit is configured to determine presence of an intersection based on the traveling environment information acquired by the traveling environment information acquisition unit. The vehicle position information acquisition unit is configured to estimate a vehicle position of the vehicle. The predicted travel path setting unit is configured to, when the intersection determination unit determines that the intersection is present, set a predicted travel path at a time when the vehicle enters the intersection based on vehicle behavior before entering the intersection. The vehicle behavior is obtained from a change over time in information on the vehicle position acquired by the vehicle position information acquisition unit. The blinker signal acquisition unit is configured to acquire a blinker signal. The traffic division information acquisition unit is configured to acquire traffic division information of a lane in which the vehicle is traveling on a basis of the traveling environment information acquired by the traveling environment information acquisition unit. The determination unit is configured to determine whether directions indicated by three factors match each other. The three factors are the traffic division information acquired by the traffic division information acquisition unit, the blinker signal acquired by the blinker signal acquisition unit, and the predicted travel path predicted by the predicted travel path setting unit. The notifier is configured to, when the determination unit determines that directions indicated by the two factors of the three factors match each other and a mismatch occurs between a direction indicated by a remaining factor excluding the two factors of the three factors, issue a notification about the mismatch of the direction indicated by the remaining factor before entering the intersection.

An aspect of the disclosure provides a driving assist device. The driving assist device includes circuitry. The circuitry is configured to acquire traveling environment information that is information on a traveling environment ahead of a vehicle. The circuitry is configured to determine presence of an intersection on a basis of the acquired traveling environment information. The circuitry is configured to estimate a vehicle position of the vehicle. The circuitry is configured to, upon determining that an intersection is present, set a predicted travel path at a time when the vehicle enters the intersection on a basis of vehicle behavior before entering the intersection, set a predicted travel path at a time when the vehicle enters the intersection on a basis of vehicle behavior before entering the intersection. The vehicle behavior is obtained from a change over time in information on the estimated vehicle position. The circuitry is configured to acquire a blinker signal indicating a left turn or a right turn. The circuitry is configured to acquire traffic division information of a lane in which the vehicle is traveling on a basis of the acquired traveling environment information. The circuitry is configured to determine whether directions indicated by three factors match each other. The three factors are the acquired traffic division information, the acquired blinker signal. The circuitry is configured to, upon determining that directions indicated by two factors of the three factors match each other and a mismatch occurs between the directions indicated by two factors and a direction indicated by a remaining factor of the three factors, issue a notification about the mismatch of the direction indicated by the remaining factor.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

With the technique described in JP-A No. 2019-16000, first, an alert is issued when the driver attempts to advance the vehicle. However, if the vehicle has already entered the intersection, an urgent notification or display issued when the driver attempts to advance the vehicle may fluster the driver.

Furthermore, this technique may not support a case where the driver has advanced to a traffic division designated as a direction other than the desired travel direction.

It is desirable to provide a driving assist device that can correctly guide a driver in the direction of a designated traffic division before an intersection, even in a case where the driver has advanced to a traffic division designated as a direction other than the desired travel direction, and remove any unease or discomfort that the driver may experience.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the present embodiment is described assuming left-hand traffic. Thus, left and right is intended be interchanged when applying the present embodiment to a road in a right-hand traffic jurisdiction.

Figure 1:
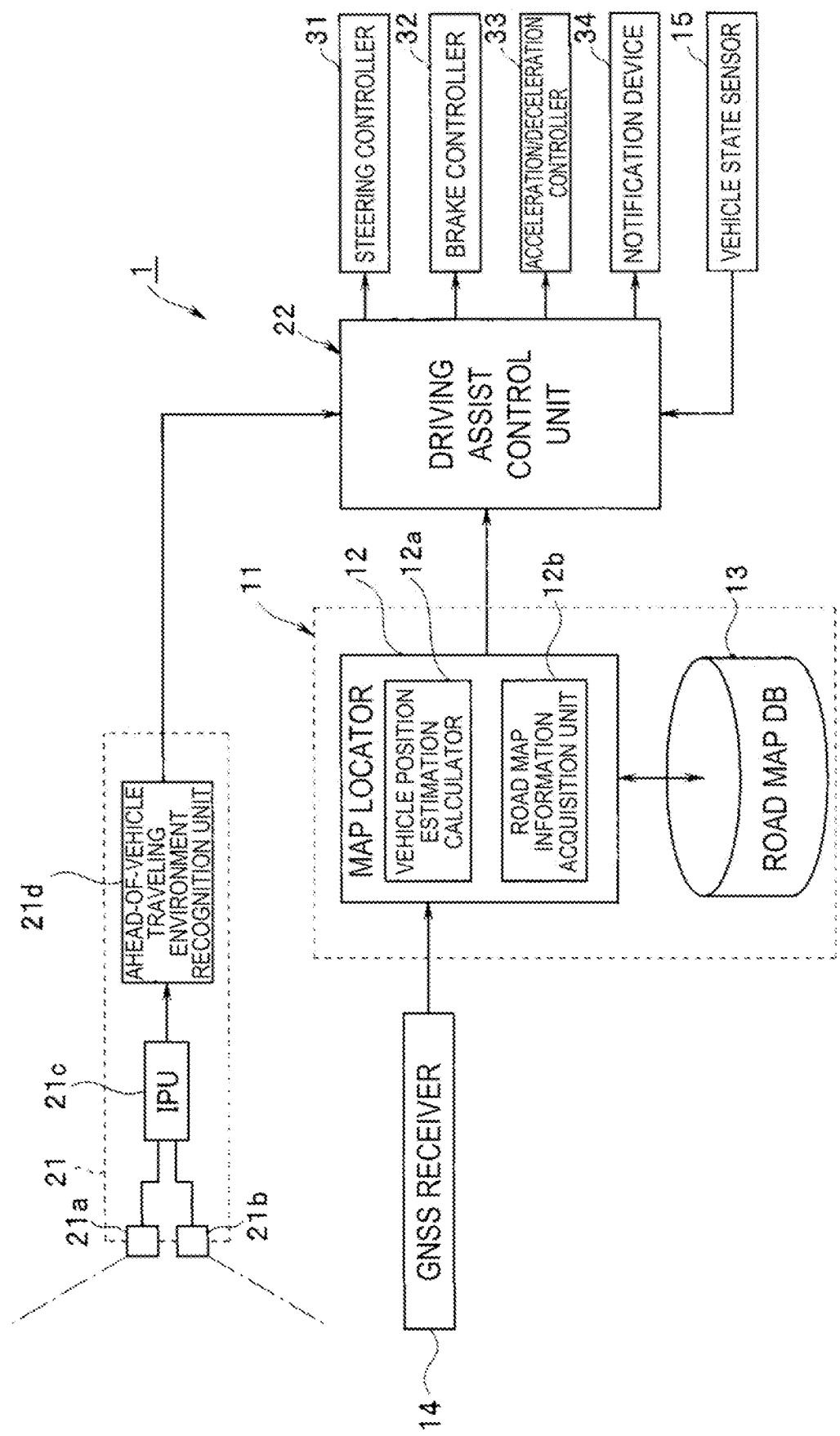
FIG. 1 is a schematic configuration diagram of a driving assist device.

A driving assist device 1 illustrated in FIG. 1 is installed in a vehicle M (see FIGS. 3 to 6). The driving assist device 1 includes a locator unit 11, a camera unit 21, and a driving assist control unit 22. In one embodiment, the locator unit 11 may serve as a "vehicle position information acquisition unit".

The locator unit 11 estimates the current position (vehicle position) of the vehicle M on a road map and acquires road map data of the area around the vehicle position. The camera unit 21 acquires traveling environment information being information relating to the traveling environment ahead of the vehicle M. Further, the camera unit 21 recognizes lane markings that define the lanes (traveling lanes) where the vehicle M is traveling, road signs, road markings indicating the traffic divisions for each travel direction marked in the traveling lanes, static information including pedestrian crossings, dynamic information including preceding vehicles, pedestrians, and bicycles, and the like.

The locator unit 11 includes a map locator calculator 12 and a road map database 13. The map locator calculator 12, and an ahead-of-vehicle traveling environment recognition unit 21d and a driving assist control unit 22 (described below) are constituted by microcontrollers including a CPU, RAM, ROM, rewritable non-volatile memory (flash memory or EEPROM), and peripheral units. The ROM stores programs, fixed data, and the like necessary for the CPU to execute various processing. The RAM is provided as a working area of the CPU and temporarily stores various types of data in the CPU. Note that the CPU is also referred to as a microprocessor (MPU) or a processor. Also, a graphics processing unit (GPU) or a graph streaming processor (GSP) may be used instead of the CPU. Alternatively, a CPU, a GPU, and a GSP may be selectively used in combination.

The map locator calculator 12 is coupled to, at an input side, a global navigation satellite system (GNSS) receiver 14. The GNSS receiver 14 receives a positioning signal emitted from positioning satellites.

The map locator calculator 12 includes a vehicle position estimation calculator 12a and a road map information acquisition unit 12b. The vehicle position estimation calculator 12a acquires the positional coordinates (latitude, longitude, altitude), i.e., the position information of the vehicle M on the basis of the positioning signal received by the GNSS receiver 14.

The road map information acquisition unit 12b performs map matching of the positional coordinates (latitude, longitude, altitude) of the vehicle M on the road map stored in the road map database 13, and estimates the vehicle position on the road map. The road map database 13 is a large-capacity storage medium such as an HDD and stores the road map information. Note that the road map information may also include position information of intersections and pedestrian crossings, and lane information indicating traffic divisions for each travel direction before intersections.

The camera unit 21 is fixed to a central upper portion of a front area in a cabin of the vehicle M. The camera unit 21 includes an onboard camera (stereo camera) including a main camera 21a and a sub-camera 21b, an image processing unit (IPU) 21c, and the ahead-of-vehicle traveling environment recognition unit 21d. The cameras 21a and 21b are disposed at left-right symmetrical positions on either side of the center in the vehicle width direction with a predetermined baseline length. The cameras 21a and 21b are both wide-angle cameras that can capture a wide range to the left and right in the vehicle width direction immediately ahead of the vehicle M, as indicated by the dot-dash lines in FIG. 1.

The camera unit 21 executes predetermined image processing via the IPU 21c on traveling environment image information captured for a predetermined imaging region If (see FIGS. 3 to 5) ahead of the vehicle M by the cameras 21a and 21b. The ahead-of-vehicle traveling environment recognition unit 21d reads the traveling environment image information after image processing by the IPU 21c, and recognizes and acquires ahead-of-vehicle traveling environment information on the basis of the traveling environment image information. Examples of the acquired ahead-of-vehicle traveling environment information include the shape of the road where the vehicle M travels (road curvature (1/m) at the center of the lane marking defining the left and right, width (vehicle width) between the left/right lane markings), stationary targets including intersections, road signs, and pedestrian crossings, moving targets (e.g., pedestrians and bicycles), preceding vehicles traveling ahead, and oncoming vehicles traveling in the oncoming lane.

Note that the camera unit 21 may be a monocular camera including only the main camera 21a Further, instead of the sub-camera 21b, an ultrasonic wave sensor, a millimeter wave radar, a microwave radar, an infrared sensor, a laser radar, light detection and ranging (LiDAR), or a combination of two or more thereof may be used to search in a wide area ahead of the vehicle M and recognize the ahead-of-vehicle traveling environment information via the ahead-of-vehicle traveling environment recognition unit 21d.

The driving assist control unit 22 is coupled to, at an input side, the map locator calculator 12, the ahead-of-vehicle traveling environment recognition unit 21d of the camera unit 21, and a vehicle state sensor 15. The vehicle state sensor 15 is a generic name for a sensor group that detects various states relating to the vehicle M. Examples of the vehicle state sensor 15 include a vehicle speed sensor that detects the vehicle speed (speed of vehicle) of the vehicle M, a steering angle sensor that detects the steering angle of the vehicle M, a yaw rate sensor that detects the yaw rate that acts on the vehicle body, an accelerator pedal position sensor that detects the amount by which the accelerator pedal is depressed, and a signal or the like from a brake switch that turns on when the brake pedal is depressed or a blinker switch that turns the left and right blinkers on/off.

The driving assist control unit 22 is coupled to, at an output side, a steering controller 31 that assists the steering wheel operation of the driver by driving electric power steering (EPS), a brake controller 32 that decelerates the vehicle M via forced braking, an acceleration/deceleration controller 33 that controls the output of a driving source (engine, electric motor, or the like) installed in the vehicle M, and a notification device 34 that functions as a notifier that notifies the driver of necessary information via audio or images.

The driving assist control unit 22 reads road signs installed on the road shoulder, intersections ahead of the vehicle, and road markings indicating the traffic divisions for each travel direction marked in the traveling lanes before an intersection from the ahead-of-vehicle traveling environment information recognized via the ahead-of-vehicle traveling environment recognition unit 21d of the camera unit 21 (see FIGS. 3 to 6).

Note that information indicating intersections and traffic divisions for each travel direction can also be read from the road map information acquired by the road map information acquisition unit 12b of the map locator calculator 12.

In a case where an intersection ahead of the vehicle M is detected, the driving assist control unit 22 configures a predicted travel path predicting whether the driver will advance the vehicle M by traveling straight, turning right, or turning left on the basis of vehicle behavior.

Then, on the basis of the traffic division of the lane where the vehicle M is traveling, the predicted travel path, and the signal (blinker signal) from the blinker switch that indicates a left or right turn, the driving assist control unit 22 checks whether the direction in which the driver is attempting to advance the vehicle M matches the direction designated by the traffic division. The driving assist control unit 22 further checks, in a case where the traveling direction of the vehicle M is a left turn or a right turn (hereinafter abbreviated to "left or right turn"), whether an ON signal has been output from the blinker switch. Then, in a case where the travel direction does not match the direction designated by the traffic division, this fact is reported and forced intervention including forced braking and steering assist may be performed to guide the vehicle M in the direction designated by the traffic division.

Figure 2A:
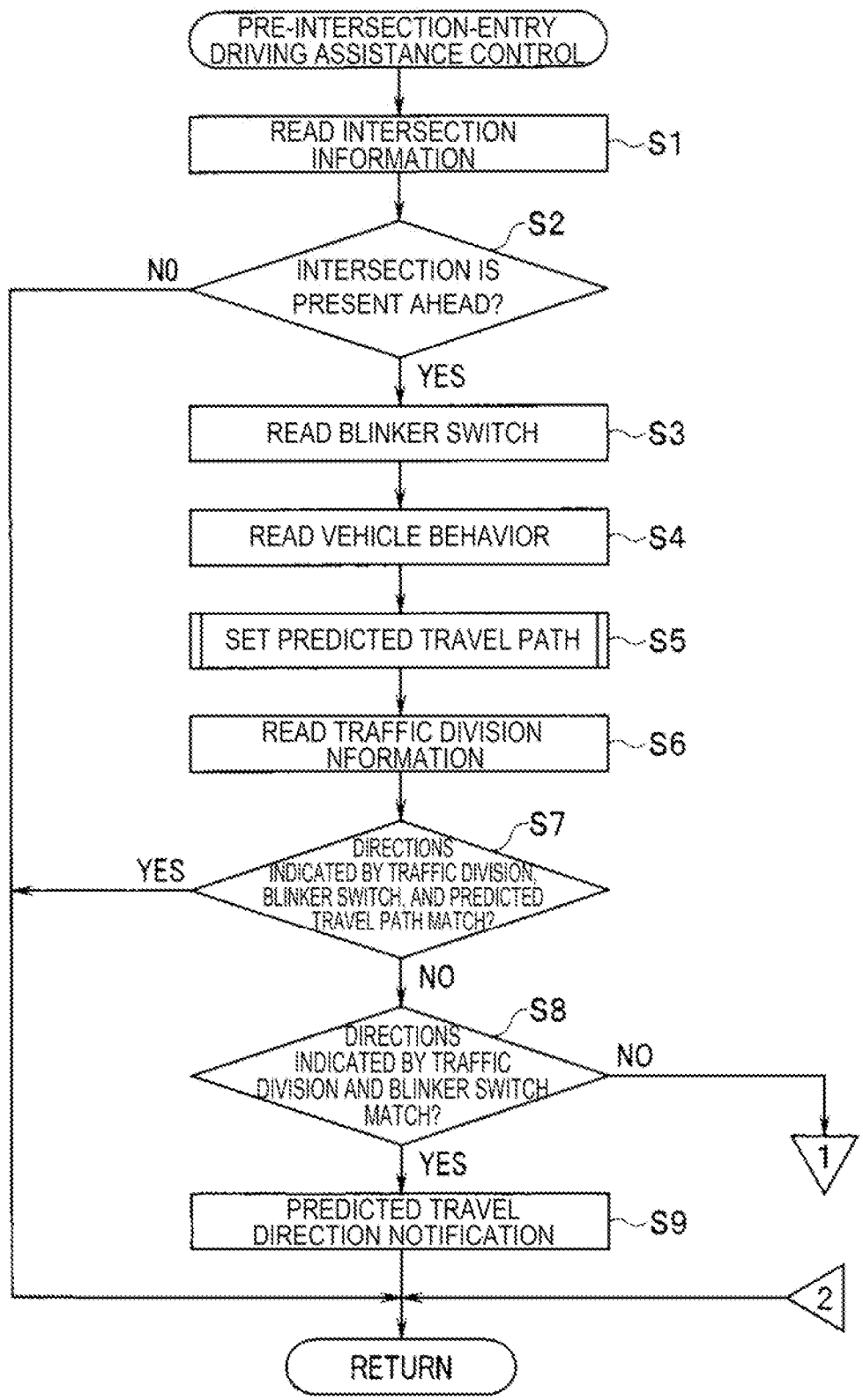
FIG. 2A is a flowchart (1) illustrating a pre-intersection-entry driving assist control routine.
Figure 2B:
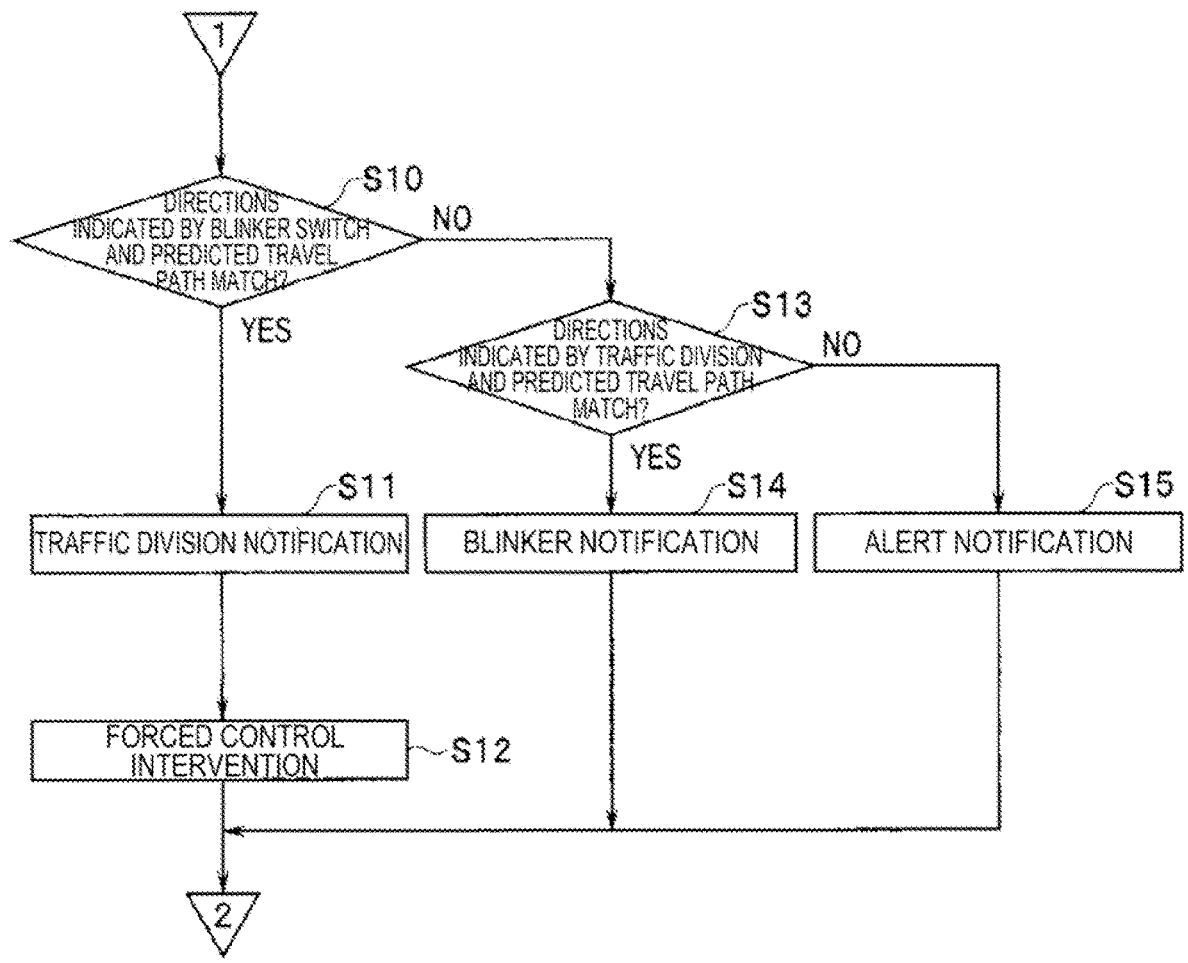
FIG. 2B is a flowchart (2) illustrating the pre-intersection-entry driving assist control routine.

In one example, the above-described driving assistance performed by the driving assist control unit 22 before entering an intersection is performed in accordance with a pre-intersection-entry driving assist control routine illustrated in FIGS. 2A and 2B. The routine is performed, after system start-up, at predetermined calculation cycles. First, in step S1, intersection information indicating whether an intersection is present within a 20 to 30 m range ahead of the vehicle M is read. The intersection information is acquired from the ahead-of-vehicle traveling environment information recognized by the ahead-of-vehicle traveling environment recognition unit 21d of the camera unit 21. Alternatively, the intersection information may be acquired from the road map information read by the road map information acquisition unit 12b of the map locator calculator 12. The ahead-of-vehicle traveling environment recognition unit 21d or the road map information acquisition unit 12b correspond to a traveling environment information acquisition unit of the disclosure.

Then, in step S2, in a case where it is determined that an intersection is present, the processing proceeds to step S3. Alternatively, in a case where it is determined that intersection is not present, the routine ends. Note that the term "intersection" includes both four-way intersections as illustrated in FIGS. 3 to 6 and also T-intersections. Note that the processing of steps S1 and S2 is handled by an intersection determination unit of the disclosure.

In a case where the processing proceeds to step S3, a blinker signal included in the vehicle state sensor 15 is read.

Note that the processing of this step is handled by a blinker signal acquisition unit of the disclosure.

Next, the processing proceeds to step S4, and the vehicle behavior is read. This vehicle behavior is the amount of change in the position of the vehicle M at every calculation cycle. The travel trajectory of the vehicle M can be obtained by performing approximation using interpolation polynomial or using a method of least squares, to the vehicle behavior. The vehicle behavior is obtained from the change over time in vehicle position estimated by the vehicle position estimation calculator 12a of the map locator calculator 12, or the change over time in vehicle speed detected by the vehicle speed sensor and the steering angle detected by the steering angle sensor (or the yaw rate detected by the yaw rate sensor). These sensors are included in the vehicle state sensor 15.

Subsequently, the processing proceeds to step S5, and the predicted travel path of the vehicle M when entering the intersection is set on the basis of the vehicle behavior read in step S4. Note that the processing of steps S4 and S5 is handled by a predicted travel path setting unit of the disclosure.

The predicted travel path will now be described with reference to FIGS. 3 to 6. Note that, in the diagrams, the vehicle behavior is denoted by a dot-dash line, and the predicted travel path is denoted by an arrow with hatching. In the diagrams, to facilitate description, the vehicle behavior is illustrated as being ahead of the vehicle M and the predicted travel path is illustrated as a continuation of the vehicle behavior. However, in actuality, the vehicle behavior is set in accordance with the travel trajectory of the vehicle M, meaning it is set after passage of the vehicle M.

Figure 4:
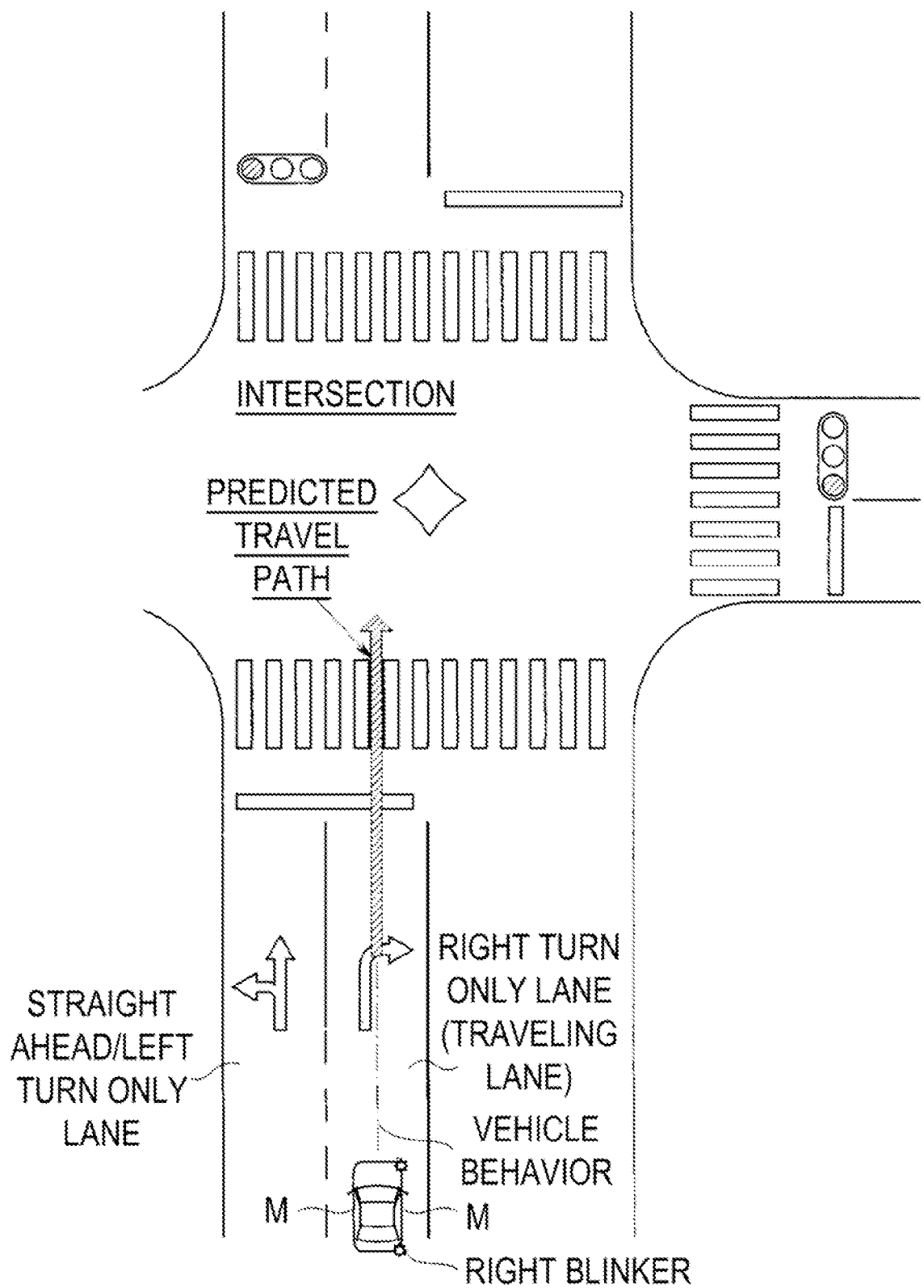
FIG. 4 is an overhead view illustrating a state where the direction designated by a traffic division and the direction indicated by a blinker signal match but a direction of a predicted travel path does not match these directions.
Figure 5:
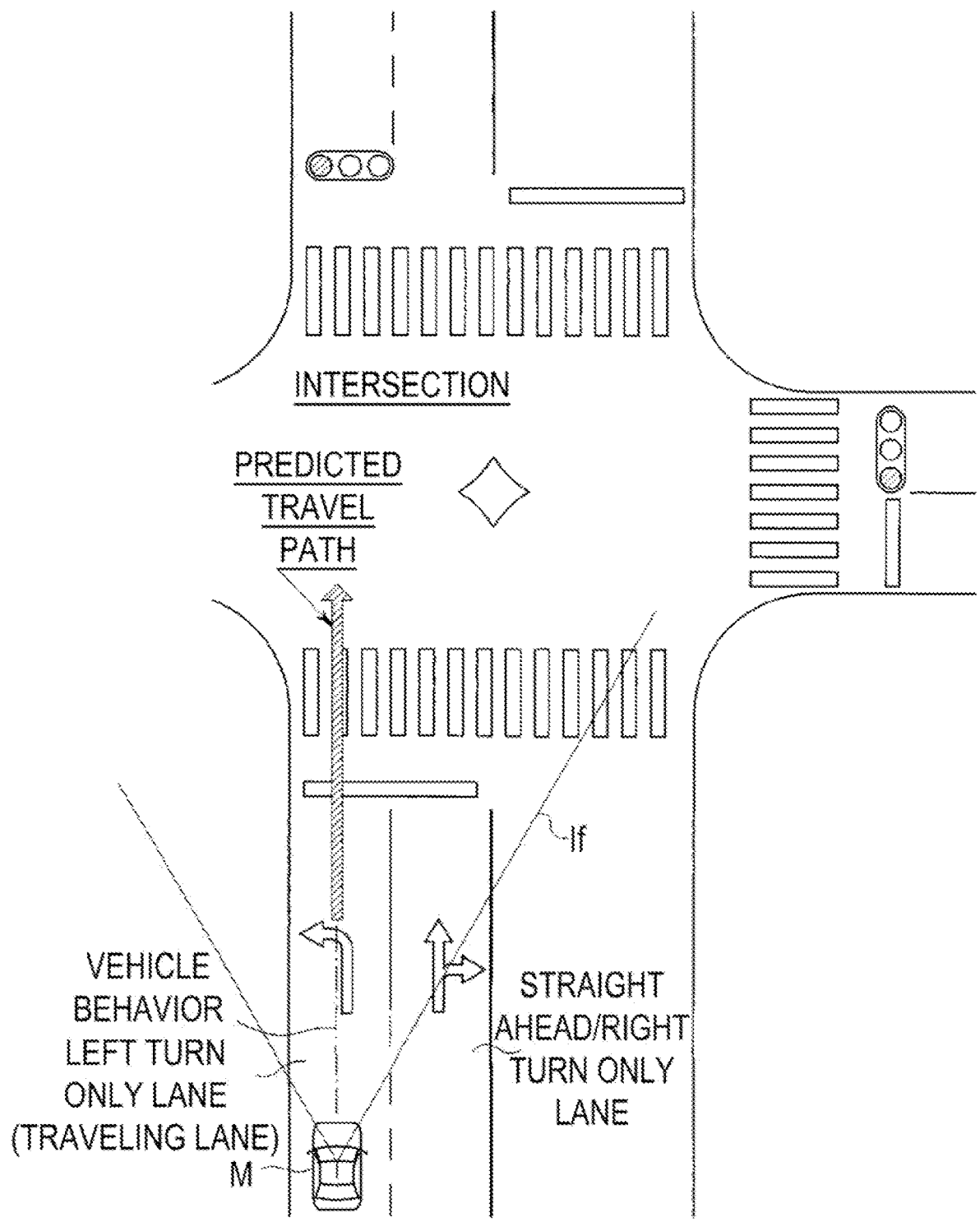
FIG. 5 is an overhead view illustrating a state where the direction of a predicted travel path and the direction indicated by a blinker signal match but the direction designated by the traffic division does not match these directions.

As described above, the travel trajectory is obtained by performing approximation using an approximation formula to the vehicle behavior at every calculation cycle. Thus, as illustrated in FIGS. 4 and 5, for example, in a case where the vehicle M has traveled straight ahead to an intersection, the predicted travel path based on the vehicle behavior is set to the straight ahead direction. Alternatively, in a case where the driver wants to turn the vehicle M left at the intersection, the driver, before the intersection, uses the steering wheel to maneuver the vehicle M to the left side, slows down the vehicle M, and enters the intersection, as indicated by the vehicle behavior in FIG. 3. Also, in a case where the driver wants to turn the vehicle M right at the intersection, the driver, before the intersection, uses the steering wheel to maneuver the vehicle M to the right side, slows down the vehicle M, and enters the intersection, as indicated by the vehicle behavior in FIG. 6.

Figure 3:
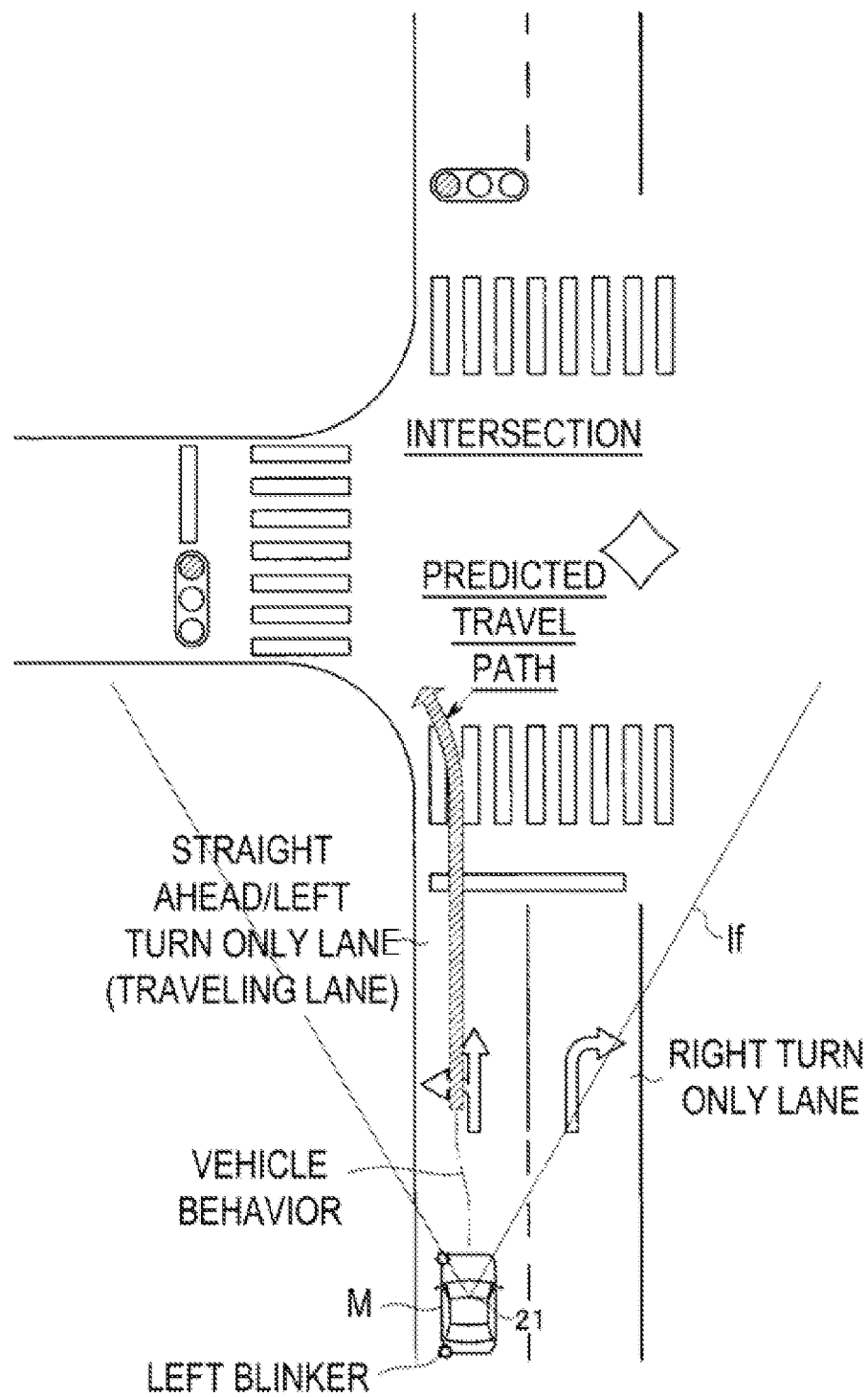
FIG. 3 is an overhead view illustrating a state where a traveling lane, a blinker, and a predicted travel path match when a left turn is attempted.

Accordingly, in a case where the vehicle behavior of the vehicle M corresponds to moving from the center of the traveling lane to the left side before the intersection such as that illustrated in FIG. 3, the predicted travel path is set to the left-turn direction. Also, in a case where the vehicle behavior of the vehicle M corresponds to having moved from the center of the traveling lane to the right side before the intersection such as that illustrated in FIG. 6, the predicted travel path is set to the right-turn direction.

Next, the processing proceeds to step S6, and traffic division information of the traveling lane in which the vehicle M is traveling is read. The traffic division dictates, for each lane, the travel direction (straight ahead, right turn, left turn, etc.) for when entering the intersection. The driving assist control unit 22 reads the road signs installed on the road shoulder and the road markings marked in the traveling lanes before the intersection from the ahead-of-vehicle traveling environment information recognized by the ahead-of-vehicle traveling environment recognition unit 21d of the camera unit 21 and acquires the traffic division information. Note that the traffic division information can also be read from the road map information acquired by the road map information acquisition unit 12b of the map locator calculator 12. Note that the processing of step S6 is handled by a traffic division information acquisition unit of the disclosure.

Subsequently, in step S7, whether the traveling direction designated by the traffic division, the direction indicated by the blinker signal indicating a left or right turn, and the direction of the predicted travel path match is checked. For example, as illustrated in FIG. 3, in a case where the traffic division designated in the traveling lane of the vehicle M is straight ahead/left turn, the predicted travel path is set to the left-turn direction, and the left-blinker switch is outputting an ON signal, it is determined that all the directions match.

In a case where it is determined that all the directions match, the routine ends. When it is determined that at least one direction does not match the directions indicated by the remaining factors, the processing proceeds to step S8. From step S8 onward, the mismatch factor is extracted and corresponding processing is executed.

First, in step S8, whether the direction designated by the traffic division and the direction indicated by the blinker switch match is checked. In a case where the direction designated by the traffic division and the direction indicated by the blinker switch match, it is determined that the direction of the predicted travel path does not match these directions, and the processing proceeds to step S9.

In step S9, the notification device 34 notifies the driver that the direction of the predicted travel path is different from the travel direction designated by the traffic division and the travel direction indicated by the ON signal of the blinker switch, and the routine ends. In this manner, the driver can be made aware that the direction in which they are attempting to advance the vehicle M is different from the direction designated by the traffic division before entering the intersection, and the driver can be made to handle the situation without becoming flustered.

For example, as illustrated in FIG. 4, in a state where the vehicle M is traveling in a traveling lane designated as a right turn only traffic division, in a case where the ON signal from the right blinker switch is being output but the predicted travel path is set to the straight ahead direction, the driver is notified before entering the intersection that the predicted travel path is different.

Similarly, in a case where the traffic division is designated as straight ahead/right turn only, the OFF signal from the blinker switch is being output and the directions indicated by both match, but the predicted travel path is set to the right-turn direction, the driver is notified before entering the intersection that the direction of the predicted travel path is different.

In this manner, the driver can recognize their intention to drive straight ahead or turn right at the intersection, and perform the corresponding operation with composure before entering the intersection.

In a case where the direction designated by the traffic division and the direction indicated by the blinker switch do not match, the processing branches to step S10. In step S10, whether the direction indicated by the blinker switch and the direction of the predicted travel path match is checked. In a case where the travel direction indicated by the blinker switch and the direction of the predicted travel path match, it is determined that the direction designated by the traffic division does not match these directions and the processing proceeds to step S11. In a case where the direction indicated by the blinker switch and the direction of the predicted travel path do not match, the processing branches to step S13.

In step S11, the driver is notified by the notification device 34 to drive the vehicle M in accordance with the traffic division. Then, the processing proceeds to step S12. As illustrated in FIG. 5, for example, in a state where the vehicle M is traveling in a traveling lane designated as a left turn only traffic division, in a case where the ON signal from the blinker switch is not being output and the predicted travel path is set to the straight ahead direction, it is determined that the traffic division is different.

However, since the direction designated by the traffic division takes priority in vehicle traffic, the processing proceeds to step S12, the driving assist control unit 22 intervenes with forced control of the vehicle M, and the routine ends.

The forced control intervention performed in step S12 causes the vehicle M to safely travel in the direction (left turn in FIG. 5) in accordance with the traffic division. In the event of forced control intervention, first, a control signal for decelerating to a speed slow enough to steer in the direction (left-turn direction in FIG. 5) in accordance with the traffic division in the intersection is output to the brake controller 32 on the basis of the vehicle speed detected by the vehicle speed sensor and the distance to the intersection. Furthermore, a steering signal is output to a steering controller 31, steering assist is performed until the driver takes over the steering wheel operation, and the vehicle M is guided in the direction designated by the traffic division.

As a result, even if the driver has advanced the vehicle M to a traffic division designated as a direction other than the desired travel direction, the vehicle M can be correctly guided in the direction designated by the traffic division before the intersection without flustering the driver, removing any unease or discomfort that the driver may experience.

Further, with the forced control intervention by the driving assist control unit 22, the driver can be intuitively notified that the travel direction of the vehicle M is incorrect. As a result, the determination time used by the driver to correct the traveling direction can be reduced.

On the other hand, in a case where the processing branches to step S13, whether the direction designated by the traffic division and the direction of the predicted travel path match is checked. Then, in a case where the direction designated by the traffic division and the direction of the predicted travel path match, it is determined that the direction indicated by the blinker switch does not match these directions. Then the processing proceeds to step S14. In a case where the direction designated by the traffic division and the direction of the predicted travel path do not match, the processing branches to step S15.

In step S14, the notification device 34 notifies the driver to turn on the blinker switch for the direction in which the vehicle M is advancing, or, in a case where the predicted travel path is set to the straight ahead direction, to turn off the blinker switch, and the routine ends.

Figure 6:
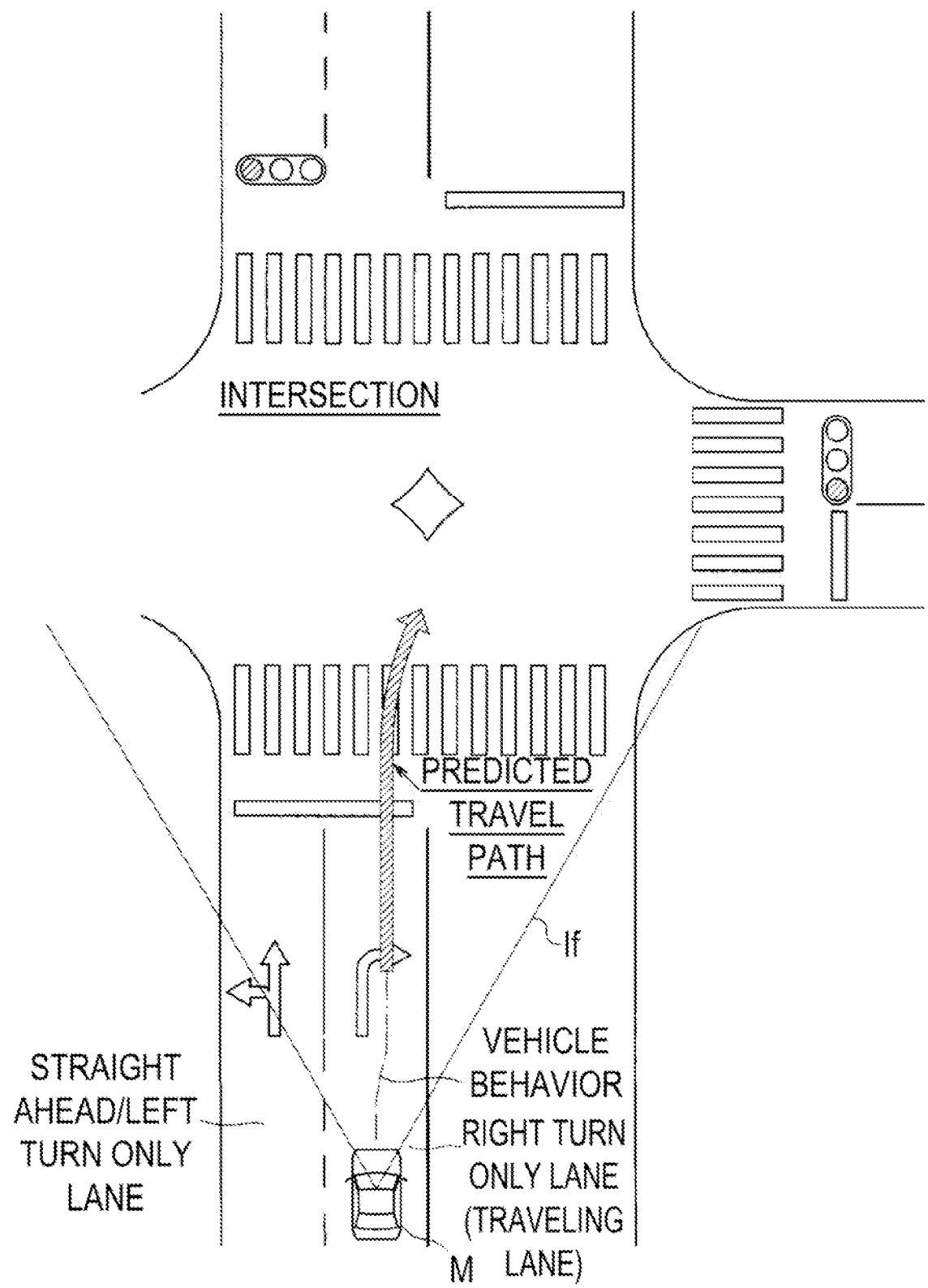
FIG. 6 is an overhead view illustrating a state where the direction of a predicted travel path and the direction designated by a traffic division match but the direction indicted by a blinker signal does not match these directions.

For example, as illustrated in FIG. 6, a state where the vehicle M is traveling in a traveling lane designated as right turn only by the traffic division and the right blinker switch is in an off state despite the predicted travel path being set to the right-turn direction is interpreted as a state where the driver has forgotten to operate the blinker switch. Thus, in step S14, the driver is notified of the fact that the blinker switch has not been operated, and the routine ends. Note that in this case, the blinker switch for the direction of the predicted travel path may be forcibly operated.

In a case where the processing proceeds to step S15, an alert is issued from the notification device 34 and the routine ends. The driver is notified by the alert that all three factors, i.e., the direction designated by the traffic division, the direction of the predicted travel path, and the direction indicated by the blinker switch do not match. Alternatively, an alert may be issued to the driver notifying the driver of the direction designated by the traffic division designated in the traveling lane.

In this manner, in a case where the vehicle enters an intersection, the driving assist control unit 22 according to the present embodiment first reads three factors. The three factors include the blinker signal, the predicted travel path in the intersection obtained from the vehicle behavior, and the traffic division designated in the traveling lane. The driving assist control unit 22 then checks whether the directions indicated by the three factors being the traffic division of the lane in which the vehicle is traveling, the blinker signal, and the predicted travel path match. In a case where it is determined that the directions indicated by two of the three factors match but the direction indicated by the remaining factor does not match these directions, control corresponding to the discrepancy between factors, such as notifying the driver of the discrepancy before entering the intersection, is performed. Thus, even in a case where the driver had advanced the vehicle to a traffic division designated as a direction different from the desired travel direction, the driver can correctly guide the vehicle M in the direction designated by the traffic division before the intersection without becoming flustered. As a result, any unease or discomfort that the driver may experience can be eliminated.

Note that the disclosure is not limited to the embodiments described above, and, for example, the disclosure can be applied to a three-way intersection or a five-way or larger intersection provided that a traffic division is designated.

The invention claimed is:

1. A driving assist device comprising:
a traveling environment information acquisition unit configured to acquire traveling environment information that is information on a traveling environment ahead of a vehicle;
an intersection determination unit configured to determine presence of an intersection based on the traveling environment information acquired by the traveling environment information acquisition unit;
a vehicle position information acquisition unit configured to estimate a vehicle position of the vehicle;
a predicted travel path setting unit configured to, when the intersection determination unit determines that the intersection is present, set a predicted travel path at a time when the vehicle enters the intersection based on vehicle behavior before entering the intersection, the vehicle behavior being obtained from a change over time in information on the vehicle position acquired by the vehicle position information acquisition unit;
a blinker signal acquisition unit configured to acquire a blinker signal indicating a left turn or a right turn;
a traffic division information acquisition unit configured to acquire traffic division information of a lane in which the vehicle is traveling on a basis of the traveling environment information acquired by the traveling environment information acquisition unit;
a determination unit configured to determine whether directions indicated by three factors match each other, the three factors being the traffic division information acquired by the traffic division information acquisition unit, the blinker signal acquired by the blinker signal acquisition unit, and the predicted travel path predicted by the predicted travel path setting unit; and
a notifier configured to, when the determination unit determines that directions indicated by two factors of the three factors match each other and a mismatch occurs between the directions indicated by the two factors and a direction indicated by a remaining factor excluding the two factors of the three factors, issue a notification about the mismatch of the direction indicated by the remaining factor.

2. The driving assist device according to claim 1, wherein the two factors are the traffic division information and the blinker signal, and the remaining factor is the predicted travel path, and
the notifier notifies a driver who drives the vehicle of a mismatch of a direction indicated by the predicted travel path.

3. The driving assist device according to claim 1, wherein the two factors are the blinker signal and the predicted travel path, and the remaining factor is the traffic division information, and the notifier notifies a driver who drives the vehicle of a mismatch of a direction indicated by the traffic division information.

4. The driving assist device according to claim 3, further comprising
a forced control intervention unit configured to forcibly guide the vehicle in the direction indicated by the traffic division information in a case where the determination unit determines that the direction indicated by the traffic division information does not match the directions indicated by the two factors.

5. The driving assist device according to claim 1, wherein
the two factors are the predicted travel path and the traffic division information, and the remaining factor is the blinker signal, and
the notifier notifies a driver who drives the vehicle of a mismatch of a direction indicated by the blinker signal.

6. The driving assist device according to claim 2, wherein
the two factors are the predicted travel path and the traffic division information, and the remaining factor is the blinker signal, and
the notifier notifies the driver of a mismatch of a direction indicated by the blinker signal.

7. The driving assist device according to claim 3, wherein
the two factors are the predicted travel path and the traffic division information, and the remaining factor is the blinker signal, and
the notifier notifies the driver of a mismatch of a direction indicated by the blinker signal.

8. The driving assist device according to claim 4, wherein
the two factors are the predicted travel path and the traffic division information, and the remaining factor is the blinker signal, and
the notifier notifies the driver of a mismatch of a direction indicated by the blinker signal.

9. A driving assist device comprising circuitry configured to
acquire traveling environment information that is information on a traveling environment ahead of a vehicle; and
determine presence of an intersection based on the acquired traveling environment information;
estimate a vehicle position of the vehicle;
upon determining that the intersection is present, set a predicted travel path at a time when the vehicle enters the intersection based on vehicle behavior before entering the intersection, the vehicle behavior being obtained from a change over time in information on the estimated vehicle position;
acquire a blinker signal indicating a left turn or a right turn;
acquire traffic division information of a lane in which the vehicle is traveling based on the acquired traveling environment information;
determine whether directions indicated by three factors match each other, the three factors being the traffic division information, the blinker signal, and the predicted travel path; and
upon determining that directions indicated by two factors of the three factors match each other and a mismatch occurs between the directions indicated by the two factors and a direction indicated by a remaining factor excluding the two factors of the three factors, issue a notification about the mismatch of the direction indicated by the remaining factor.

* * * * *